United States Patent
Dairokuno

(10) Patent No.: US 6,182,802 B1
(45) Date of Patent: Feb. 6, 2001

(54) ELASTIC-TUBE-OPERATED BRAKE BAND

(75) Inventor: Satoshi Dairokuno, Shizuoka-ken (JP)

(73) Assignee: NSK-Warner K.K., Tokyo (JP)

(*) Notice: Under 35 U.S.C. 154(b), the term of this patent shall be extended for 0 days.

(21) Appl. No.: 09/288,616

(22) Filed: Apr. 9, 1999

(30) Foreign Application Priority Data

Apr. 10, 1998 (JP) .................................................. 10-137338

(51) Int. Cl.$^7$ .................................................. F16D 51/00
(52) U.S. Cl. .......................... 188/74; 188/77 R; 192/88 B
(58) Field of Search .............................. 188/77 R, 77 W, 188/74, 78, 75, 76, 249, 259; 267/122; 192/88 B

(56) References Cited

U.S. PATENT DOCUMENTS

| | | | |
|---|---|---|---|
| 2,731,122 | 1/1956 | Dodge | 192/45.1 |
| 3,049,205 | 8/1962 | Ferris et al. | 192/45.1 |
| 4,360,093 | 11/1982 | Wakabayashi et al. | 192/41 A |
| 5,291,978 | 3/1994 | Numata | 192/45.1 |
| 5,372,227 | 12/1994 | Kinoshita et al. | 192/45 |
| 5,758,755 | 6/1998 | Igari | 192/45.1 |

FOREIGN PATENT DOCUMENTS 35-26215 * 10/1960 (JP).

* cited by examiner

Primary Examiner—Douglas C. Butler
Assistant Examiner—Xuan Lan Nguyen
(74) Attorney, Agent, or Firm—Evenson, McKeown, Edwards & Lenahan, P.L.L.C.

(57) ABSTRACT

An elastic-tube-operated brake band is used by arranging it between an inner member and an outer member. The brake band includes a ring-shaped strap with a friction material fixedly secured on a circumferential surface thereof. The brake band is also with an elastic tube which is arranged on a side of an opposite circumferential surface of the ring-shaped strap. By a pressure produced by charging pressure fluid into the tube, the friction material is brought into engagement with a counterpart via the ring-shaped strap to transmit a torque between the inner member and the outer member. The ring-shaped strap is fixed at opposite ends thereof with play in a circumferential direction, respectively.

5 Claims, 6 Drawing Sheets

ELASTIC-TUBE-OPERATED BRAKE BAND

BACKGROUND OF THE INVENTION a) Field of the Invention

This invention relates to an elastic-tube-operated brake band suitable for use in an automatic transmission, brake or the like.

b) Description of the Related Art

For binding a brake band in a brake, it is the common practice to press a bracket attached to an end of a strap. The bracket is however subjected to localized force. The brake band of this type is therefore accompanied by an inconvenience that any attempt to enhance the strength of the bracket leads to an increase in manufacturing cost.

An apparatus was hence contemplated such that pressure can be applied by charging pressure fluid into a tube arranged between an inner member and an outer member and inflating the tube. In this design, however, the tube is required to have substantial strength as torques are borne by the tube itself. The tube must therefore be provided with a significant thickness, leading to an inconvenience in that the brake band cannot avoid a dimensional increase.

To solve the above-described inconvenience, it was then contemplated to arrange a strap, which carries a friction material bonded on an inner circumferential surface thereof, between the tube and the inner member.

FIG. 8 is a cross-sectional view, which illustrates the above-mentioned conventional elastic-tube-operated brake band at numeral 10. FIG. 8 shows an outer frame 20, a folded portion 21 of the outer frame 20, a pressure fluid supply hole 22 of an elastic tube 40, a ring-shaped strap 30, a folded portion 31 of the strap 30, a bolt 32 connecting the outer frame 20 and the folded portion 31 of the strap 30 with each other, a friction material 50 bonded on an inner circumferential surface of the strap 30, and a void space 60 which should be occupied by an unillustrated counterpart to be bound, namely, an inner member (for example, a drum). The strap is folded at opposite ends thereof to prevent the tube 40 from bulging out into direct contact with the counterpart when the tube 40 is inflated.

In the above-described conventional brake band, force is not applied directly to the tube 40 but is applied to the tube 40 via the strap 30. This has made it possible to eliminate a circumferential load which would otherwise be applied from the counterpart to the tube. The strap 30 is however fixed at only one end thereof on the outer frame 20, resulting in a drawback that in the illustrated case, self-engaging force can be produced between the strap and the inner member only when a torque acts counterclockwise.

SUMMARY OF THE INVENTION

An object of the present invention is therefore to solve the above-described drawback of the conventional elastic-tube-operated brake band, and specifically to provide an elastic-tube-operated brake band in which self-engaging force is produced between a strap and a counterpart no matter whether a torque acts counterclockwise or clockwise, that is, irrespective of the direction of the torque.

As a result of extensive research, the present inventor has found that the above-described object of the present invention can be achieved by fixing a strap at opposite ends thereof with play in a circumferential direction, respectively.

In one aspect of the present invention, there is thus provided an elastic-tube-operated brake band for being arranged between an inner member and an outer member. The brake band comprises a ring-shaped strap with a friction material fixedly secured on a circumferential surface thereof and an elastic tube arranged on a side of an opposite circumferential surface of the ring-shaped strap, whereby by a pressure produced by charging pressure fluid into the tube, the friction material is brought into engagement with a counterpart via the ring-shaped strap to transmit a torque between the inner member and the outer member. The ring-shaped strap is fixed at opposite ends thereof with play in a circumferential direction, respectively.

Owing to the above-described construction of the elastic-tube-operated brake band according to the present invention, self-engaging force is assured to act between the ring-shaped strap and the counterpart irrespective of the rotating direction of the counterpart. The elastic-tube-operated brake band according to the present invention is therefore provided with a sufficient torque capacity.

DETAILED DESCRIPTION OF THE INVENTION AND PREFERRED EMBODIMENT

Figure 1:
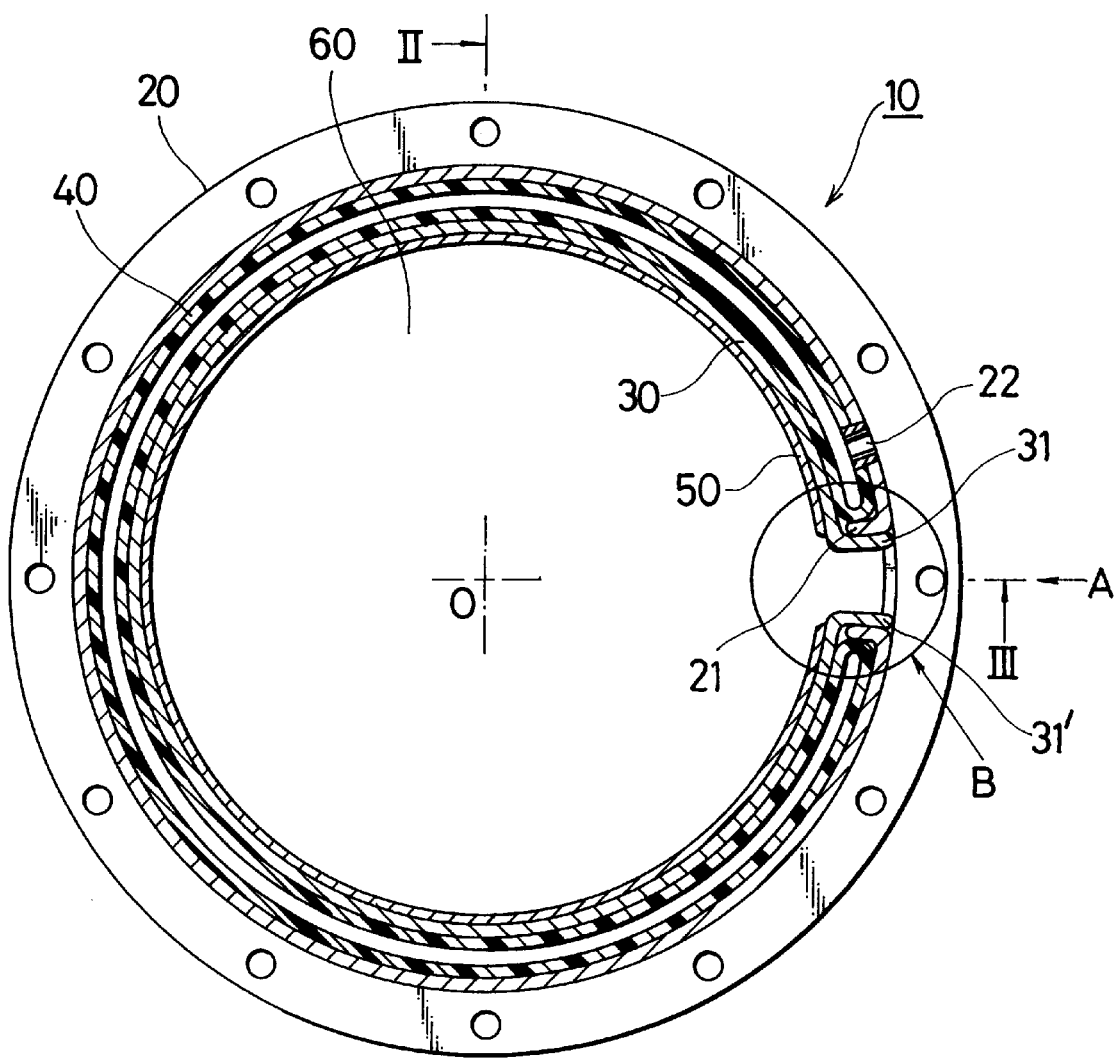
FIG. 1 is a cross-sectional view of an elastic-tube-operated brake band according to a preferred embodiment of the present invention.
Figure 2:
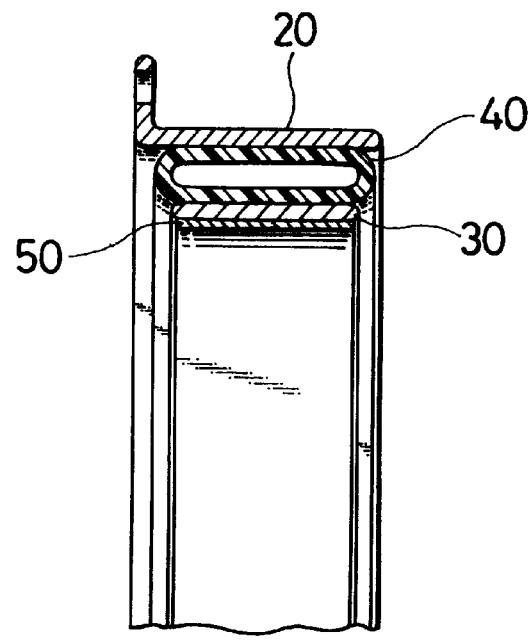
FIG. 2 is a fragmentary cross-sectional view of the elastic-tube-pressed brake band as taken along a line II-O of FIG. 1.
Figure 3:
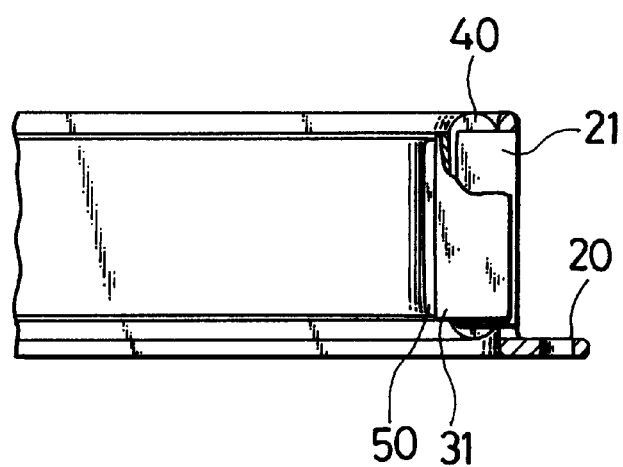
FIG. 3 is a fragmentary cross-sectional view of the elastic-tube-pressed brake band as taken along a line III-O of FIG. 1.
Figure 4:
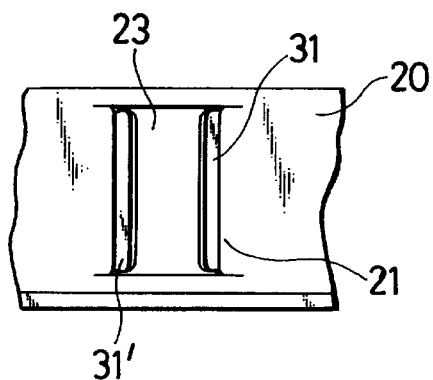
FIG. 4 is a front view of the elastic-tube-pressed brake band as viewed in the direction of A of FIG. 1.
Figure 5:
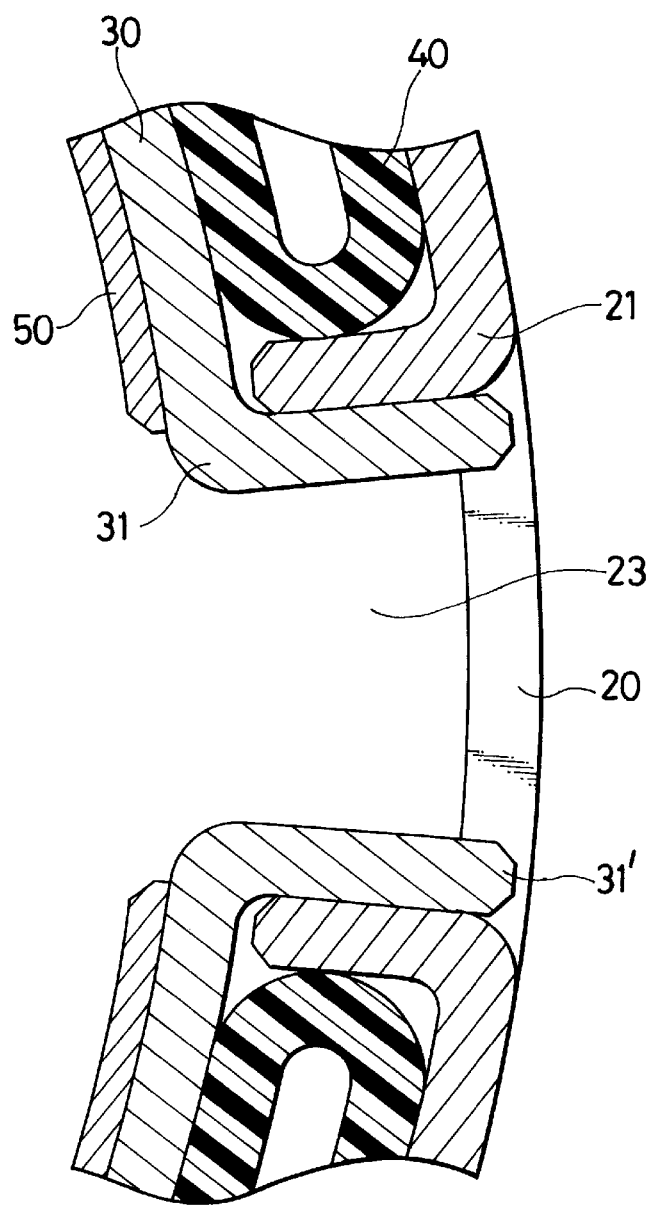
FIG. 5 is an enlarged view of a part indicated by a circle B of FIG. 1.

With reference to FIG. 1 through FIG. 7, the elastic-tube-operated brake band according to the preferred embodiment of the present invention will hereinafter be described.

FIG. 1 through FIG. 5 depict the outer frame 20 as an outer ring, the folded portion 21 of the outer frame 20, the pressure fluid supply hole 22 for the tube 40, a cut-off portion 23 formed in the outer frame 20, the ring-shaped strap 30, the folded portion 31 and a folded portion 31' formed at opposite ends of the strap 30, respectively, and the friction material 50 bonded on the inner circumferential surface of the strap 30.

The folded portion 31 of the strap 30 is not fixed by a connecting bolt or the like, but is fixed with a play in the circumferential direction by having it hooked on the folded portion 21 of the outer frame 20.

Operation of the elastic-tube-operated brake band 10 according to this embodiment will next be described with reference to FIG. 6 and FIG. 7. Firstly, reference is made to FIG. 6. Assume that the counterpart arranged in the space 60 is bound by charging pressure fluid into the tube 40 while the counterpart is rotating clockwise as indicated by an arrow R.

Figure 6:
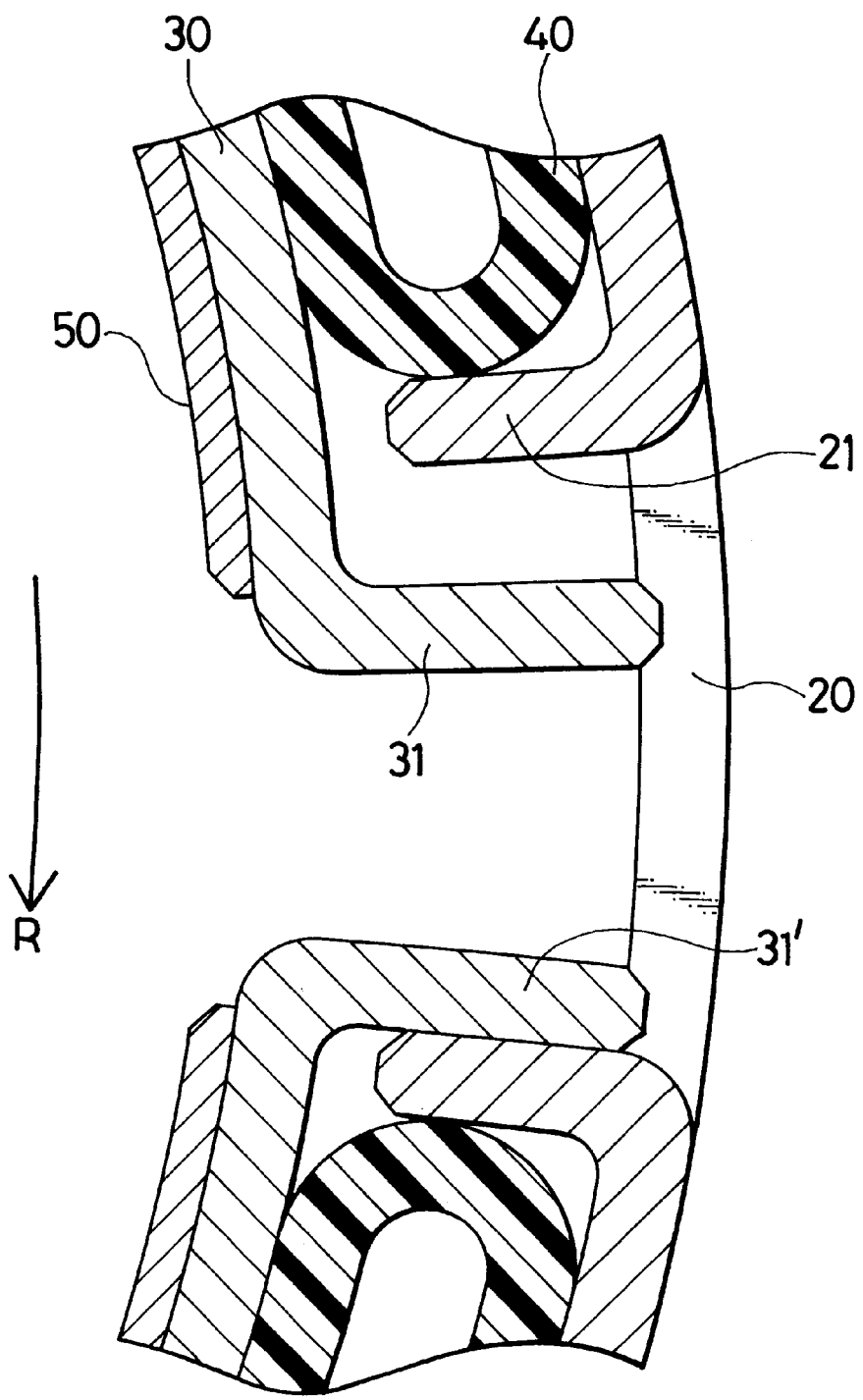
FIG. 6 is a fragmentary cross-sectional view of the elastic-tube-pressed brake band of FIG. 1, showing one example of action of a ring-shaped strap.

The strap 30 then undergoes an elastic deformation, and as is illustrated in FIG. 6, is fixed at the folded portion 31' to transmit the torque to the outer frame 20. At this time, self-engaging force is acting on the counterpart. When the pressure fluid is discharged, the strap 30 releases the counterpart owing to the shape-restoring force of the strap 30 itself.

Figure 7:
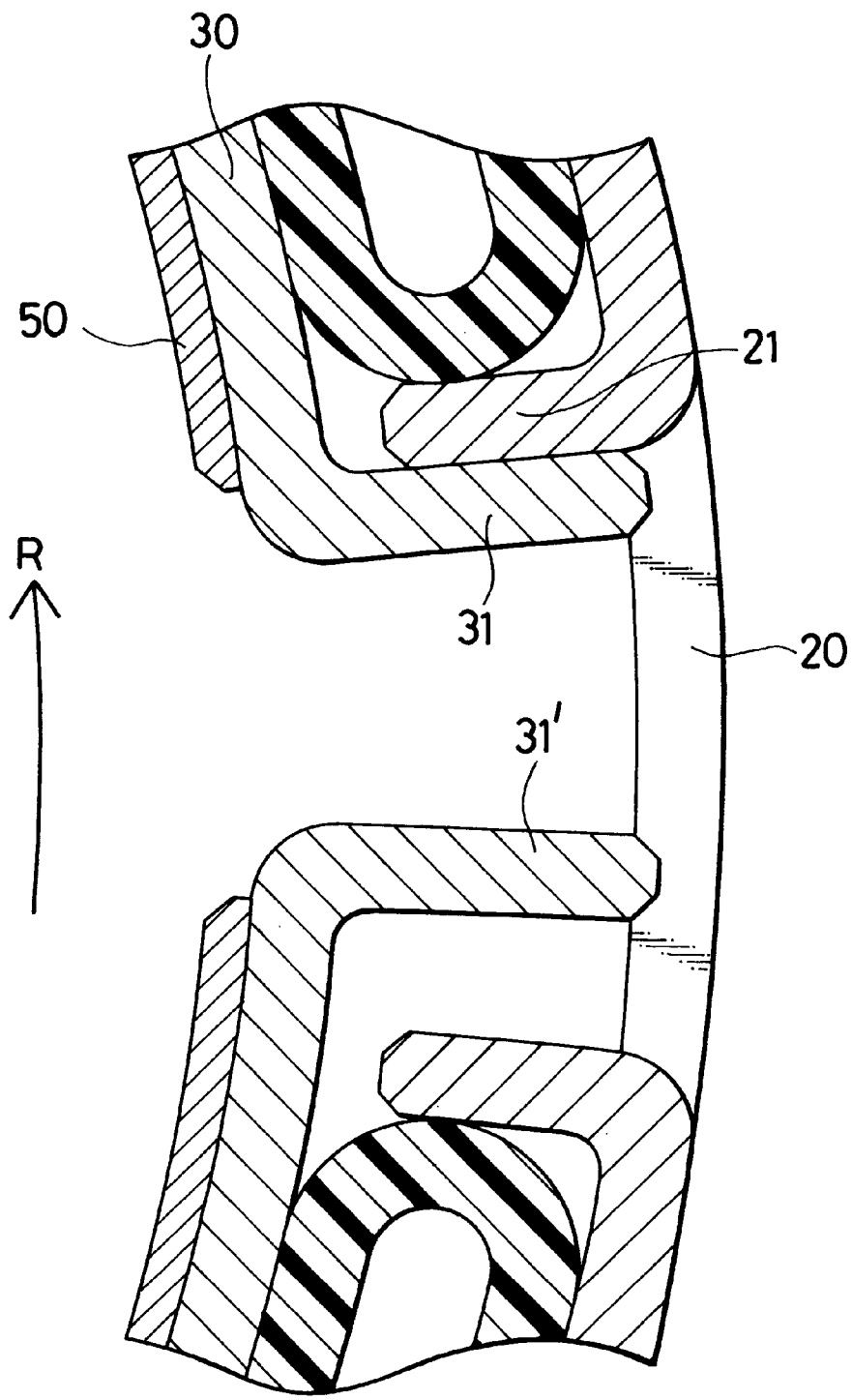
FIG. 7 is a fragmentary cross-sectional view of the elastic-tube-pressed brake band of FIG. 1, showing another example of action of the ring-shaped strap.
Figure 8:
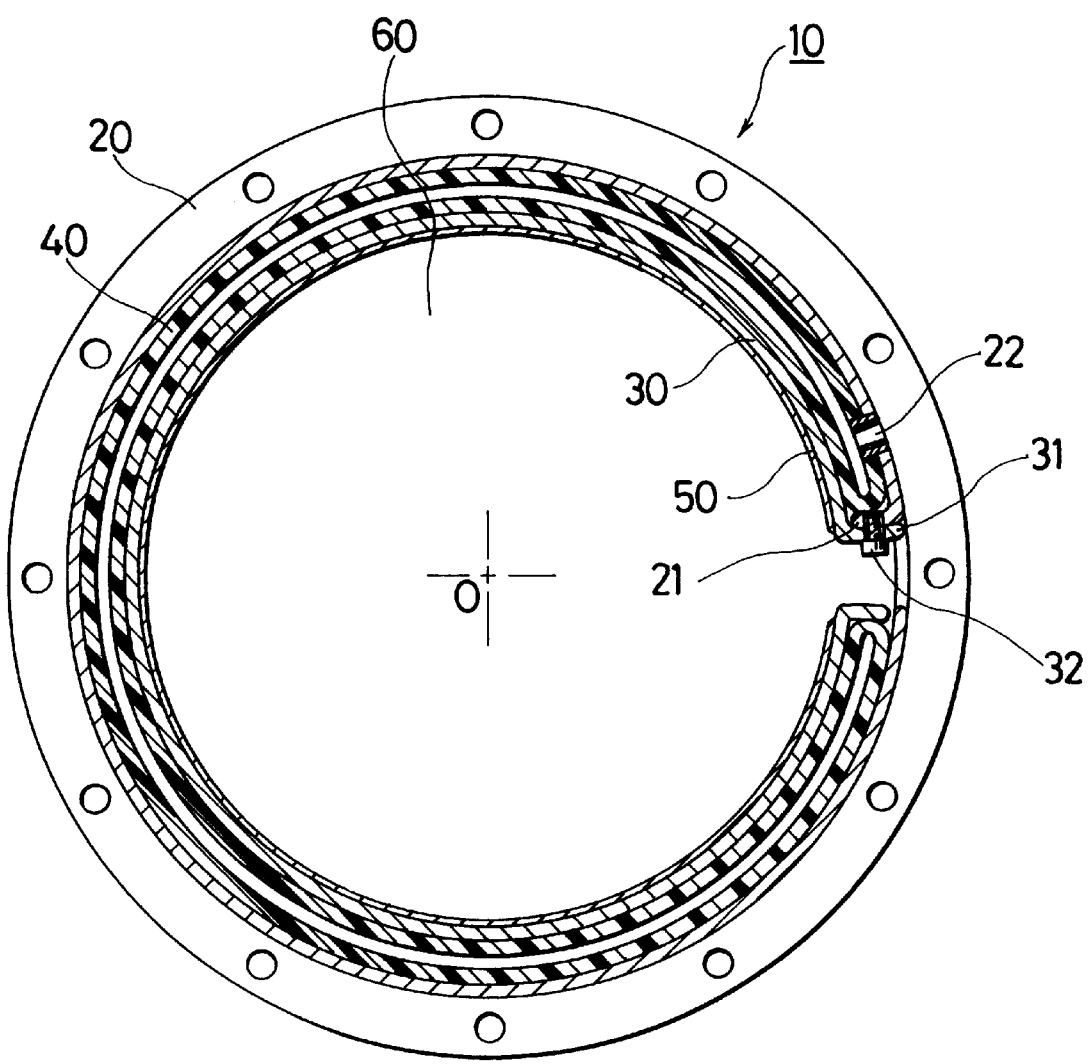
FIG. 8 is a cross-sectional view of the conventional tube-pressed brake band.

Reference is next made to FIG. 7. Assume that the counterpart is rotating in an opposite direction, specifically, the counterpart is rotating counterclockwise as indicated by an arrow R. The strap 30 is then fixed conversely at the folded portion 31 which is located on an upper side as viewed in the drawing. The strap 30 undergoes an elastic deformation and self-engaging force is produced likewise. When the pressure fluid is discharged, the strap 30 releases the counterpart owing to the shape-restoring force of the strap 30 itself.

What is claimed is:

1. An elastic-tube-operated brake band for being arranged between an inner member and an outer member, said brake band comprising a ring-shaped strap with a friction material fixedly secured on a circumferential surface thereof and an elastic tube arranged on a side of an opposite circumferential surface of said ring-shaped strap, whereby by a pressure produced by charging pressure fluid into said tube, said friction material is brought into engagement with a counterpart via said ring-shaped strap to transmit a torque between said inner member and said outer member, wherein said ring-shaped strap is fixed at both of its opposite ends to one of said inner member and said outer member with play in a circumferential direction.

2. An elastic-tube-operated brake band according to claim 1, wherein said ring-shaped strap is fixed at said opposite ends thereof on said outer member with play in said circumferential direction; wherein said friction material is fixedly secured on an inner circumferential surface of said ring-shaped strap; and wherein said elastic tube is arranged on a side of an outer circumferential surface of said ring-shaped strap.

3. An elastic-tube-operated brake band according to claim 1, wherein said ring-shaped strap is fixed at said opposite ends thereof with play in said circumferential direction; wherein said friction material is fixedly secured on a first circumferential surface of said ring-shaped strap; and wherein said elastic tube is arranged on a side of a second circumferential surface of said ring-shaped strap.

4. An elastic-tube-operated brake band according to claim 1, wherein said ring-shaped strap is folded at said opposite ends thereof.

5. An elastic-tube-operated brake band according to claim 1, wherein at least one of said inner member and said outer member is folded on sides of opposite ends of said elastic tube.

* * * * *